United States Patent
Hauser

(10) Patent No.: US 10,699,235 B2
(45) Date of Patent: Jun. 30, 2020

(54) SYSTEM, METHOD AND COMPUTER READABLE MEDIUM FOR PLACING ADVERTISEMENTS INTO WEB PAGES

(75) Inventor: Robert R Hauser, Frisco, TX (US)

(73) Assignee: ORACLE AMERICA, INC., Redwood Shores, CA (US)

(*) Notice: Subject to any disclaimer, the term of this patent is extended or adjusted under 35 U.S.C. 154(b) by 267 days.

(21) Appl. No.: 12/435,770

(22) Filed: May 5, 2009

(65) Prior Publication Data

US 2010/0287134 A1    Nov. 11, 2010

(51) Int. Cl.
*G06Q 30/02* (2012.01)
*G06Q 10/06* (2012.01)

(52) U.S. Cl.
CPC ....... *G06Q 10/06375* (2013.01); *G06Q 30/02* (2013.01); *G06Q 30/0254* (2013.01); *G06Q 30/0263* (2013.01); *G06Q 30/0277* (2013.01)

(58) Field of Classification Search
CPC ................................................ G06Q 10/06375
USPC ......................................................... 705/14
See application file for complete search history.

(56) References Cited

U.S. PATENT DOCUMENTS

| | | | |
|---|---|---|---|
| 6,848,108 B1 | 1/2005 | Caron | |
| 7,051,042 B2 | 5/2006 | Krishnaprasad et al. | |
| 7,136,875 B2 | 11/2006 | Anderson et al. | |
| 7,606,810 B1 | 10/2009 | Jeavons | |
| 7,716,161 B2 | 5/2010 | Dean et al. | |
| 8,229,915 B1 | 7/2012 | Lloyd et al. | |
| 2004/0093327 A1 | 5/2004 | Anderson et al. | |
| 2004/0139192 A1* | 7/2004 | Spaid | 709/224 |
| 2007/0266311 A1* | 11/2007 | Westphal | 715/526 |
| 2008/0071929 A1* | 3/2008 | Motte et al. | 709/246 |
| 2008/0189254 A1* | 8/2008 | Cancel et al. | 707/3 |
| 2008/0214156 A1* | 9/2008 | Ramer | G06F 17/30749 455/414.1 |
| 2008/0249798 A1* | 10/2008 | Tulshibagwale | 705/1 |
| 2008/0255937 A1 | 10/2008 | Chang et al. | |
| 2008/0256056 A1* | 10/2008 | Chang et al. | 707/5 |
| 2008/0306819 A1* | 12/2008 | Berkhin et al. | 705/14 |
| 2009/0006375 A1* | 1/2009 | Lax | H04N 21/435 |
| 2009/0099891 A1 | 4/2009 | Cohen et al. | |

(Continued)

FOREIGN PATENT DOCUMENTS

WO    WO 2006110472 A2 * 10/2006

OTHER PUBLICATIONS

Atterer, et al., "Knowing the user's every move : user activity tracking for website usability evaluation and implicit interaction", WWW '06 Proceeding s of the 15 International conference on World Wide Web, May 2006 (Year: 2006).*

(Continued)

*Primary Examiner* — Arunava Chakravarti
(74) *Attorney, Agent, or Firm* — Kilpatrick Townsend & Stockton, LLP

(57) ABSTRACT

Selection of web page advertisements for placement into a web page may use attention data that ranks the elements of the web page according to the attention the elements receive from users during interactions with the web page. The content of ads can be matched to the content of the most highly ranked elements of the web page rather than the web page as a whole. Alternatively, ads can be selected that historically produce a preferred pattern of behavior such as an attention shift from a highly ranked element of the web page to the ad.

16 Claims, 11 Drawing Sheets

(56) References Cited

U.S. PATENT DOCUMENTS

| | | | | |
|---|---|---|---|---|
| 2009/0254424 A1* | 10/2009 | Swanson | | 705/14 |
| 2009/0299862 A1* | 12/2009 | Fan | | G06Q 30/02 |
| | | | | 705/14.73 |
| 2009/0319355 A1* | 12/2009 | Sinyagin et al. | | 705/14.25 |
| 2009/0327265 A1* | 12/2009 | Wang et al. | | 707/5 |

OTHER PUBLICATIONS

Florian Mueller, Andrea Lockerd, "Cheese: Tracking Mouse Movement Activity on Websites, a Tool for User Modeling", Conference on Human Factors in Computing Systems, CHI '01 extended abstracts on Human factors in computing systems, Seattle, Washington, Session: Short talks: of mice and measures, pp. 279-280, Year of Publication: 2001, ISBN: 1-58113-340-5, MIT Media Lab, 2001, Cambridge, MA 02139 USA.

U.S. Appl. No. 13/287,511, filed Nov. 2, 2011 received a Non-Final Office Action dated Jan. 10, 2012, 10 pages.

U.S. Appl. No. 13/287,511, filed Nov. 2, 2011 received a Final Office Action dated Mar. 28, 2012, 10 pages.

U.S. Appl. No. 13/287,511, filed Nov. 2, 2011 received a Non-Final Office Action dated Mar. 4, 2013, 15 pages.

U.S. Appl. No. 13/287,511, filed Nov. 2, 2011 received a Final Office Action dated Aug. 9, 2013, 15 pages.

U.S. Appl. No. 13/287,511, filed Nov. 2, 2011 received a Non-Final Office Action dated Jan. 16, 2014, 18 pages.

U.S. Appl. No. 13/287,511, filed Nov. 2, 2011 received a Final Office Action dated Jun. 4, 2014, 18 pages.

U.S. Appl. No. 13/287,511, filed Nov. 2, 2011 received a Non-Final Office Action dated Oct. 2, 2014, 19 pages.

U.S. Appl. No. 13/287,511, filed Nov. 2, 2011 received a Final Office Action dated Mar. 6, 2015, 18 pages.

U.S. Appl. No. 13/287,511, filed Nov. 2, 2011 received a Non-Final Office Action dated Aug. 11, 2015, 18 pages.

U.S. Appl. No. 13/287,511, filed Nov. 2, 2011 received a Final Office Action dated Jan. 21, 2016, 17 pages.

U.S. Appl. No. 13/287,511, filed Nov. 2, 2011 received a Non-Final Office Action dated Jun. 23, 2016, 16 pages.

U.S. Appl. No. 13/287,511, filed Nov. 2, 2011 received a Final Office Action dated Nov. 30, 2016, 16 pages.

* cited by examiner

110

| Event | e1 | e2 | e3 | e4 | e5 | e6 | e7 | e8 | e9 | e10 | e11 | e12 | e13 | e14 | ... |
|---|---|---|---|---|---|---|---|---|---|---|---|---|---|---|---|
| Event type | ms. mov | ms. mov | ms. mov | ms. mov | ms. mov | ms. mov | ms. mov | ms. mov | ms. mov | ms. mov | ms. mov | ms. mov | ms. mov | ms. mov | ... |
| x | 100 | 102 | 104 | 106 | 110 | 119 | 121 | 123 | 126 | 131 | 135 | 138 | 140 | 142 | ... |
| y | 100 | 101 | 100 | 99 | 106 | 115 | 117 | 115 | 112 | 108 | 105 | 99 | 101 | 102 | ... |
| time | 0 | 5 | 10 | 15 | 18 | 20 | 28 | 38 | 45 | 50 | 55 | 60 | 65 | 70 | ... |
| DOM element | div | div | div | body | div | div | span | div | div | div | div | body | div | div | ... |

| Attention event | a1 | a2 | ... |
|---|---|---|---|
| Attention event type | linger | hint | ... |
| Time interval | 0-70 | 15-50 | ... |
| DOM elements | <div> 100% | <span> 20% <br> <a id="link1"> 80% | ... |

Figure 11

SYSTEM, METHOD AND COMPUTER READABLE MEDIUM FOR PLACING ADVERTISEMENTS INTO WEB PAGES

FIELD OF THE INVENTION

This disclosure relates to a system, method and computer readable medium for placing advertisements into web pages.

BACKGROUND OF THE INVENTION

The performance or effectiveness of ads dynamically placed within a web page is typically measured using clickstream data. In a performance based method, when a user clicks on an ad, a URL resource for the ad web page is fetched and loaded into the client browser. Simultaneously, a statistic is updated to increase the relevance of that ad within the context, i.e. within the original web page. An alternative, content matching solution for measuring ad effectiveness uses keywords. A user wishing to place an ad enters keywords or keywords are extracted from an ad's text and used to perform relevance matching to the words within a web page. Both performance based and content matching methods may be combined to select ads that are relevant to the content and that have performed statistically well in similar contexts.

A problem with these existing methods is that they rely on click stream data which is typically coarse grained. A further problem is that these solutions tend to treat all words within the web page substantially the same, regardless of where in the web page the content appears.

What is required is a system, method and computer readable medium for selecting advertisements that makes use of how the attention of a user is directed on the web page.

SUMMARY OF THE INVENTION

In one aspect of the disclosure, there is provided a method for placing an advertisement into a web page comprising a plurality of content elements. The method comprises determining a plurality of candidate advertisements, retrieving attention data in respect of the content elements of the web page, using the attention data to select an advertisement from the candidate advertisements, and placing the selected advertisement into the web page.

In one aspect of the disclosure, there is provided an ad server for placing advertisements into a web page. The ad server comprises an ad data store that stores a plurality of ads, and an ad server processing module. The ad server processing module is configured to receive an ad request in respect of a URL, determine a set of candidate advertisements from the ad store, retrieve ad performance statistics from the ad data store for the candidate advertisements, and select an advertisement for the ad request using the ad performance statistics. The ad performance statistics comprise a plurality of attention events, each attention event indicating an element of a web page corresponding to the URL as a source element and a candidate advertisement as a destination element.

In one aspect of the disclosure, there is provided a computer-readable medium comprising computer-executable instructions for execution by a processor, that, when executed, cause the processor to receive an advertisement placement request in respect of a URL, determine a document object model of a web page corresponding to the URL, determine a plurality of document object model elements of the URL, retrieve an attention ranking of the document object model elements, determine a plurality of candidate advertisements, determine a relevance score for each candidate advertisement, and select an advertisement from the plurality of candidate advertisements dependent on the relevance scores. Determining the relevance score comprises determining a content matching factor dependent on a match of the content of the advertisement to the content of a document object model element, and weighting the content matching factor dependent on the rank of the respective document object model element.

BRIEF DESCRIPTION OF THE DRAWINGS

Reference will now be made, by way of example only, to specific embodiments and to the accompanying drawings in which:

FIG. 10 illustrates a table of event data from the mouse move events of FIG. 9;

FIG. 11 illustrates a table of attention event data from the mouse move events of FIG. 9;

DETAILED DESCRIPTION OF THE INVENTION

Figure 1:
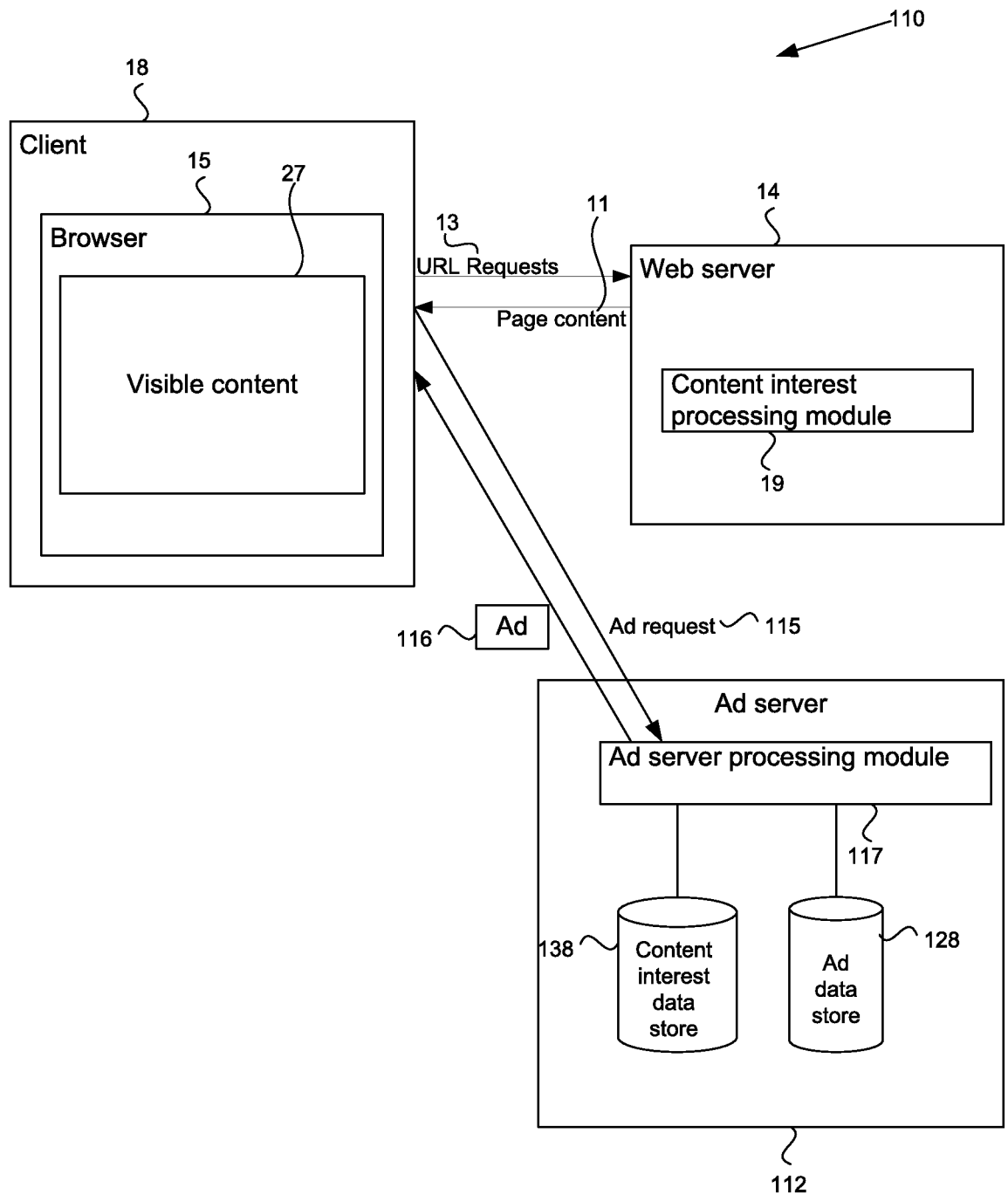
FIG. 1 illustrates an ad placement system.

A system in accordance with an embodiment of the disclosure is depicted in FIG. 1. In the system 110, a client 18 provides web page requests 13 to a web server 14, in response to which, the web server 14 provides page content 11 for display in a browser 15 of the client 18. Typically, the web page 11 will include visible content 27 as well as javascript applications.

In typical webpage protocols, a document object model (DOM) of a webpage structure may include a document, a body and several elements, including elements embedded within each other. Events, in particular user triggered events such as mouse movements, mouse clicks or keyboard events may be generated at various locations on the page. Application code, e.g. javascript applications, running in the webpage environment may register event handlers on various web page objects. The event handlers may handle events in a variety of ways. A first event handling method is referred to as event capturing. Event capturing provides an event first to the top most object in the web page hierarchical structure, i.e. DOM, and onward in a descending fashion as follows:

DOCUMENT→BODY→ELEMENT A→ELEMENT B

Event bubbling provides an event first to the bottom most object and onward in an ascending fashion as follows:

ELEMENT B→ELEMENT A→BODY→DOCUMENT

The page content 11 may include an ad request URL as a resource. When the client browser 15 loads the web page 11, an additional request 115 is placed to an ad server processing module 117 of an ad server 112 identified in the ad request URL for dynamic ad content. The ad server 112 accesses an ad data store 128 and provides ad content 116 to be incorporated into the page content.

In accordance with an embodiment of the disclosure, the placement of the ad may be performed contextually by reference to a content interest data store 138 of the ad server 112. The content interest data store stores analyzed attention data. Using the content interest data store, ad content can be selected to match areas of a web page that receive a high amount of user attention. Note that the "areas of a web page" may be restricted as a first step to the web page elements currently in the viewport. The effect of this would be to ignore a most highly attentive web page element (based on aggregate attention data within the data store from many interactions) if that element were no longer in the viewport (in this real time interaction).

Figure 2:
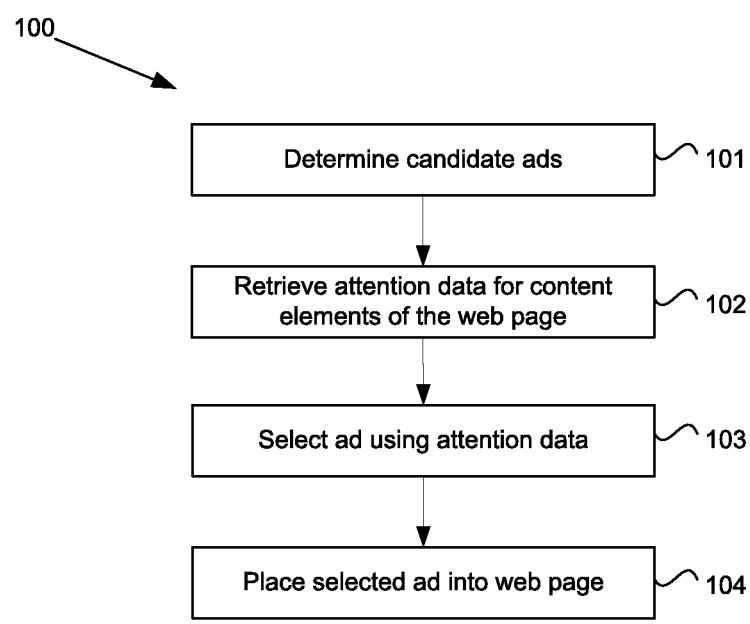
FIG. 2 illustrates a method for placing advertisements into a web page.

A method for placing an ad is illustrated in the flowchart 100 of FIG. 2. At step 101, a plurality of candidate advertisements is determined. At step 102, attention data is retrieved for the content elements of the web page from the content interest data store 138. The attention data is used to select one of the candidate advertisements 103 and the selected advertisement 116 is provided into the web page at step 104. In one embodiment, attention data, as will be described in greater detail below, is used to find the DOM element(s) of interest and then a second step is used to select the ad. The second level step may be either performance based or content based.

Figure 3:
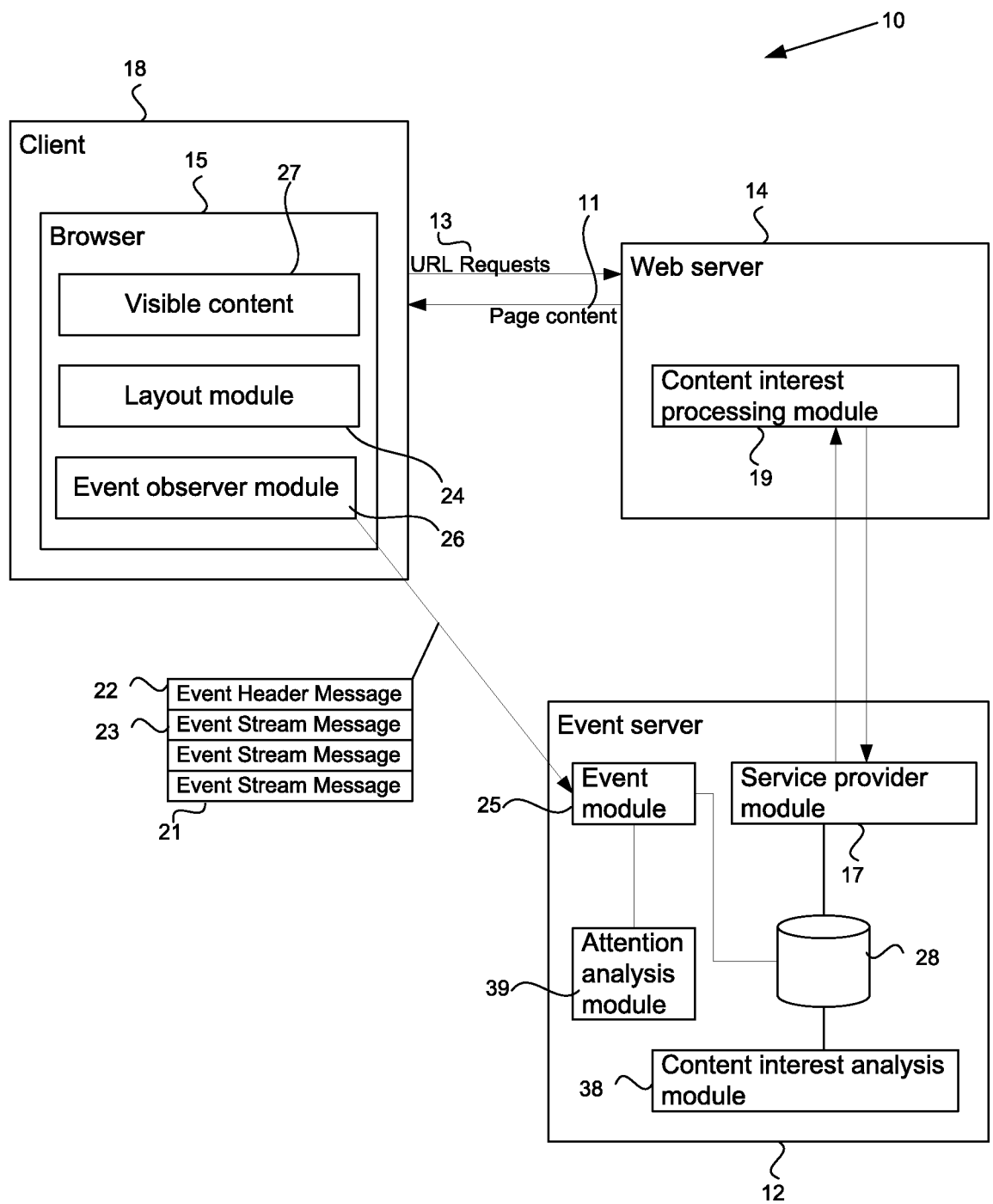
FIG. 3 illustrates a system for determining attention areas for a web page interaction.

The attention data for the content interest data store 138 may be derived using a system 10 as shown in FIG. 3 and as described in the Applicant's co-pending application, the entire contents of which are explicitly incorporated herein by reference. In this system 10, the web server 14 is modified such that the web page content 11 provided to the client 18 includes an event observer module 26 and layout module 24, both of which may be provided as appropriate code or scripts that run in the background of the client's browser 15. In one embodiment, code for providing the event observer module 26 and the layout module 24 is provided to the web server 14 by a third party service, such as provided from an event server 12, described in greater detail below.

The event observer module 26 and the layout module 24 may be provided as code embedded in a web page 11 from the web server 14. Alternatively or in addition, the event observer module 26 and the layout module 24 may be provided as a link back to the web server 14 or a third party server, e.g. event server 12, for the resource containing the code which the web browser will fetch as part of loading the web page.

The event observer module 26 observes events generated in a user interaction with the web page 11 at the client 18. The event observer module 26 records events generated within the web browser 15, such as mouse clicks, mouse moves, text entries etc., and generates event streams 21 including an event header message 22 and one or more event stream messages 23. It will be apparent to a person skilled in the art that terms used to describe mouse movements are to be considered broadly and to encompass all such cursor manipulation devices and will include a plug-in mouse, on board mouse, touch pad, pixel pen, etc.

The event observer module 26 provides the event streams 21 to the event server 12. The event server 12 may be as described in the Applicant's copending application, the entire contents of which are explicitly incorporated herein by reference, and includes an event module 25, an attention analysis module 39, and a suitable data store 28, which though shown in FIG. 3 within the event server 12, may also be provided as an offsite data store. The event server 12 also includes a service provider module 17 which interfaces with a processing module 19 of the web server 14. In embodiments of the present disclosure, the event server 12 may also include a content interest analysis module 38.

Figure 4:
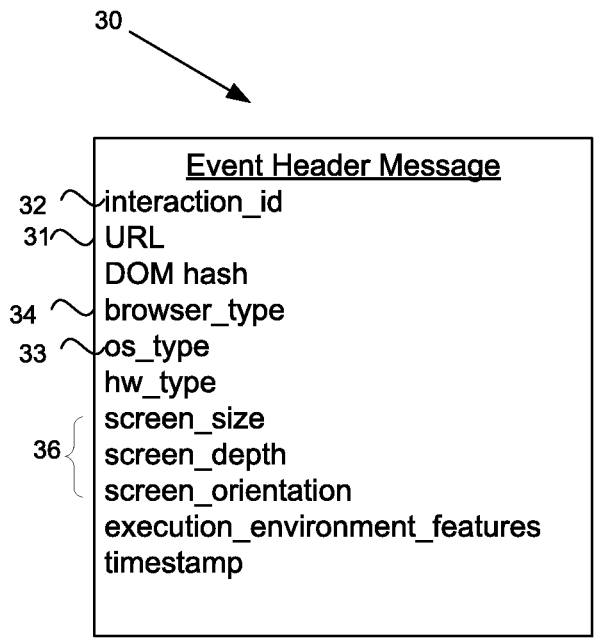
FIG. 4 illustrates an example of an event header message.
Figure 5:
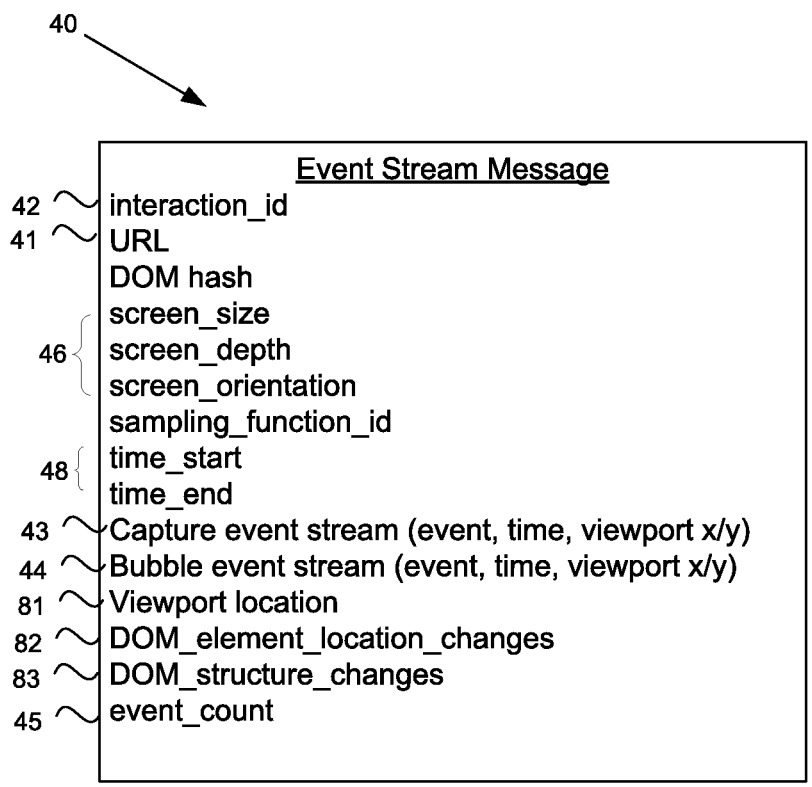
FIG. 5 illustrates an example of an event stream message.

An example of an event header message 30 is illustrated in FIG. 4 and an example of an event stream message 40 is illustrated in FIG. 5. The messages 30, 40 show a number of components that can be included, though in various embodiments, not all of these components may be required and additional components may be added. Primarily, an Interaction_ID 32, 42 uniquely identifies an interaction between the client 18 and the web server 14 and aids to identify the particular event stream 21. The event header message 30 and the event stream message 40 may also identify the Uniform Resource Locator (URL) 31, 41. Fixed parameters such as the operating system 33 and browser type 34 may form part of the event header message 30. Screen parameters 36, 46 such as the screen size, depth and orientation may be included in either or both of the event header message 30 or the event stream message 40. A capture event stream 43 and a bubble event stream 44 specifies the events recorded in respective event capture and bubbling phases during the web page interaction. Each event may be indicated by the event type, time and x/y location relative to the viewport. Not all web browser types support event capture, and thus the capture event stream 43 may be empty. Where required, events missing from the event bubble stream may be inferred, for example as described in the Applicant's co-pending application, the entire contents of which are explicitly incorporated herein by reference. An event_count field 45 may indicate the total number of unique events observed by the event observer module including those events not included in the event stream message 40 due to a current event sampling function excluding them. Timing parameters 48 may indicate the relevant period over which the event stream message 40 is current.

The event observer module 26 passes the event streams 21 to the event module 25 of the event server 12. In the embodiment illustrated in FIG. 3, the event streams 21 are provided directly to the event module 25. However, the event streams 21 may also be provided indirectly, e.g. via the web server 14.

The layout module 24 processes the web page content on the client browser 15 and augments the event stream messages 21 with viewport and DOM element layout information. Additional fields of the event stream messages 40 shown in FIG. 5 include a viewport location 81, DOM element location changes 82 and DOM structure changes 83. The DOM element location changes 82 and DOM structure changes 83 may be reported in absolute terms, or may be reported as changes in these parameters since the last report. The viewport location 81 may include a time interval over which the viewport location information can be considered valid.

During an interaction with the web page 11, a user navigates the web page 11 and may enter content where appropriate, such as in the HTML form elements. During this interaction events are generated and recorded by the event observer module 26. Events may include mouse clicks, mouse moves, key strokes etc. Periodically, the event observer module 26 formulates an event stream message 23, at which time, the event observer module provides a callback to the layout module 24 for layout data to be included in the event stream message.

Figure 6:
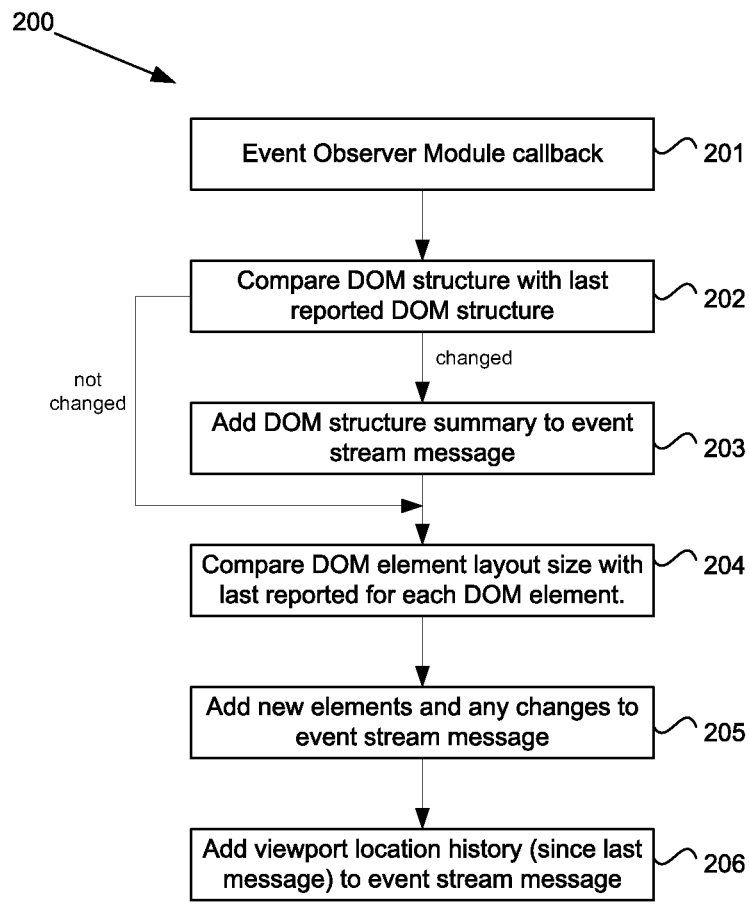
FIG. 6 illustrates an operation of a layout module.

A process 200 performed by the layout module 24 in response to the callback is shown in FIG. 6. The layout module 24 receives the event observer module callback at step 201 and proceeds to compare a current DOM structure of the web page 11 with the last reported DOM structure 202. The layout module 24 may register itself to watch DOM changes or may simply enumerate the structure as needed. If changes are observed, then a DOM structure summary is provided to the event observer module 26 to be added to the event stream message 23 (step 203). At step 204, the DOM element layout size is compared to the last reported layout size for each DOM element. New elements and any changes of the DOM element layout sizes are communicated 205 to the event observer module 26 for inclusion in the event stream message 23. The DOM element layout size can be computed using element properties "offset left" and "offset top" as is known. Alternatively, the events generated by the user, e.g. mousemove etc., can be correlated to the first element to see the event in the event bubbling phase. Since the events have x,y coordinate positions, the action of moving the mouse across a DOM element rendered in the viewport window will allow local recording of the size and location of the respective DOM element. At step 206, the viewport location history is communicated to the event observer module 26 for inclusion in the event stream message 23, after which the event stream message 23 may be communicated to the event server 12.

The event server 12 receives the event stream 21 including the augmented event stream messages 23 and processes the event streams in the event module 25. Events may be extracted from the event stream messages 23 together with the viewport data and communicated to the attention analysis module 39 for additional processing. If the event stream 21 includes a new InteractionID, data storage may be allocated in the data store and an initial DOM structure and element layout information may be recorded. When additional event stream messages are received, any updates to the viewport location, DOM structure and DOM element layout are also stored.

Figure 7:
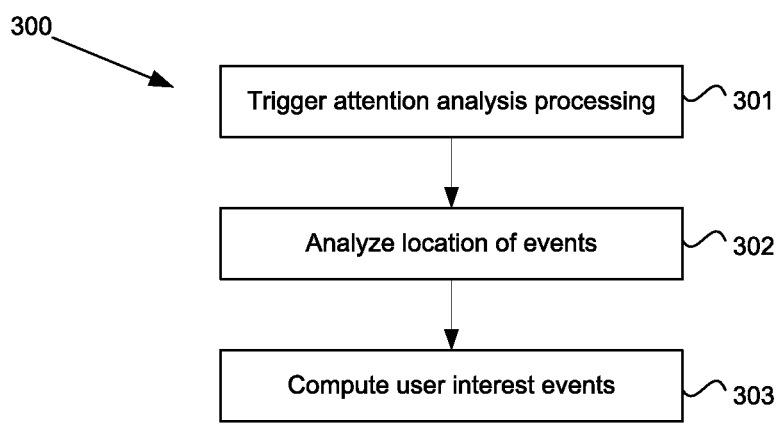
FIG. 7 illustrates an operation of an attention analysis module.

An operation 300 of the attention analysis module is shown in FIG. 7. At step 301, the attention analysis module 39 receives an analysis trigger, which might be a request, or a timeout. The attention analysis module then analyzes the location of the events in the event stream messages relative to the DOM element location in the viewport in order to compute a probabilistic locus of attention for the user (step 302). In one embodiment, the attention analysis module 39 computes the locus of attention from a plurality of mouse move events as these events can provide a fine grained indication of the user's focus in between mouse clicks. The locus of attention may be computed and stored as the user attention time per DOM element. In addition, the attention analysis module 39 may compute attention events (step 303) such as hints, lingers, hovers, partial clicks, cancelled clicks, "on element exits" etc, any of which may assist in determining to where a user's attention is directed. For example, a mousedown event followed by a mousemove may not register as a complete mouseclick, in particular if the mouseup event occurs off of a particular web page element. However, the mousedown, mousemove and mouseup events together may indicate a region of the user's interest or attention focus. In a further example, a mouse move followed by a brief period of time before the next mouse move may indicate a hover over a region of interest to the user.

The attention time and any attention events may be computed for any DOM element or for DOM elements that have a particular identifier attribute within the page. This allows a web page designer to specify content areas for which to monitor user interest.

Once the attention analysis has been performed, an attention data set comprising the results of the attention analysis and the event stream or interaction data may be stored in the data store 28. A statistical analysis of the attention data set may be performed by the content interest analysis module 38. By making use of the event data and the attention analysis data in the attention data set, aggregate measures may be formed over multiple URL visits from multiple users to determine a ranking of the content areas of a web page.

Figure 8:
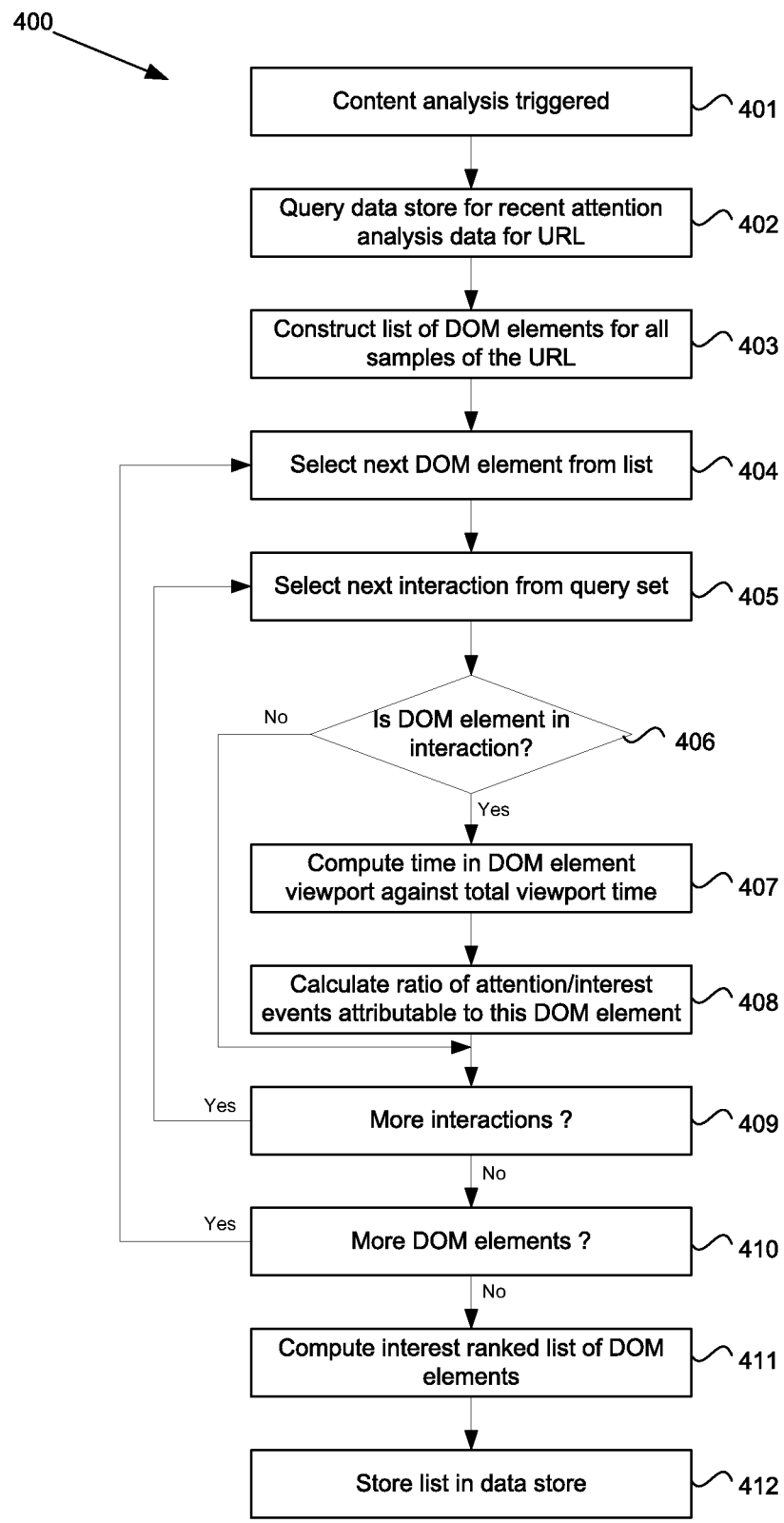
FIG. 8 illustrates an operation of a content interest processing module.

An example of the statistical analysis is depicted in the flowchart 400 of FIG. 8. Content interest analysis may be triggered at step 401 by a periodic timeout, an accumulation of unanalyzed data, a change in DOM structure, receipt of a request, or by any other suitable trigger. Content interest analysis is performed in respect of a URL, so at step 402, the data store 28 is queried for recent attention analysis data in respect of a particular URL. Any particular web page may be provided with different versions. Different samples of the web page may therefore include differing DOM elements. A query list of all DOM elements for all samples of the URL is constructed at step 403. A first DOM element is selected at step 404 and a first interaction is selected from the query list at step 405. If the DOM element is determined to be in the interaction at step 406, then the amount of time in the DOM element viewport relative to the total viewport time is determined at step 407. Total viewport time data may be determined from time stamp information 48 in the event stream messages 40 (FIG. 5). Event timing for individual elements within the viewport can be determined from the capture event streams 43 and bubble event streams 44.

The time in viewport may be computed dynamically or may have been computed at an earlier stage, e.g. during attention analysis described above and stored locally. The time in viewport may consider only the active time, that is the time where a certain event rate is maintained rather than the viewport remaining idle.

At step 408, the ratio of attention time and/or attention events attributed to this DOM element relative to the total attention time and/or attention events is computed. Attention events may be those events in the attention analysis data analyzed from the event stream such as hints, lingers, hovers, partial clicks, cancelled clicks and/or "on element" exits.

Once the viewport time ratio and the attention event ratios have been calculated for a particular DOM element in a particular interaction, then the process may be repeated for other interactions. If more interactions for the currently selected DOM element exist, as determined at step 409, then a next interaction is chosen by returning to step 405. Once all interactions in the query set have been analyzed with respect to the currently selected DOM element, then a next DOM element is selected from the query list, if available (query step 410), by returning to step 404 and the interactions for the newly selected DOM element are analyzed following the steps described above.

After all DOM elements for the URL have been analyzed, a ranked list of DOM elements can be calculated from the sum of the viewport time ratios and the attention event ratios (step 411). The ranked list(s) may be stored locally and/or provided to the content interest data store 138 of an ad server 112 to be stored 412 for later processing as will be described below.

While the flowchart 400 of FIG. 8 depicts one form of statistical analysis, other forms of statistical analysis that process the event stream data to determine the popularity of content areas of the webpage will be apparent to a person skilled in the art.

As described in the Applicant's copending application, only some of the DOM elements, i.e. particular DOM elements of interest, may undergo attention analysis. In the present disclosure, the content interest analysis module 38 may perform its processing on a subset of DOM elements stored in the data store 28. When processing is performed on a subset, only the directly correlated data may be used, that is, the data in the event stream and attention analysis stream that is recorded in respect of a DOM element within the subset. Alternatively, the content interest analysis module 38 may process data to DOM elements not in the subset in order to assign the event stream events and attention events to DOM elements in the subset.

Within the system, DOM elements may be identified in a number of ways. Typically, DOM elements must be identifiable within the layout module 24, content interest analysis module 38 and the content interest processing module 19. DOM element identification is consistent across these components. In one embodiment, the DOM element is identified by a bare identification attribute on the DOM element/page element, by an identifier based on the DOM structure and its location within that structure, or by the element's pageport location (the pageport is an artificial viewport that is exactly large enough to contain all rendered page elements).

In an alternative embodiment, a DOM element identifier may by combined with a hash of the content of the element, a locality sensitive hash (LSH) code of the content of the element, a one-way (cryptographic) hash of the content of the element and/or the actual content of the element. In these embodiments, the content changing within a DOM element can be treated with different interest analysis. If an LSH code is used, such as Nilsimsa digest or similar, it is built using the content of the DOM element (e.g. the text that is displayed) but may optionally be built to include attributes from HTML and/or CSS where those attributes affect the display of the DOM element content. The result is that DOM elements with nearly equivalent content have nearly equivalent LSH codes in their DOM element identifiers. This allows two DOM elements, from different interactions, to be considered the same for analysis if they have sufficiently similar LSH codes. The disadvantage of including more content within the DOM element identifier is that it requires more bandwidth and storage, but has the advantage of allowing greater analysis and security. The DOM element content may be communicated to the event server 12 in the event streams, or, more likely, may be communicated from the web server 14 in response to a content update request from the event server 12.

Figure 9:
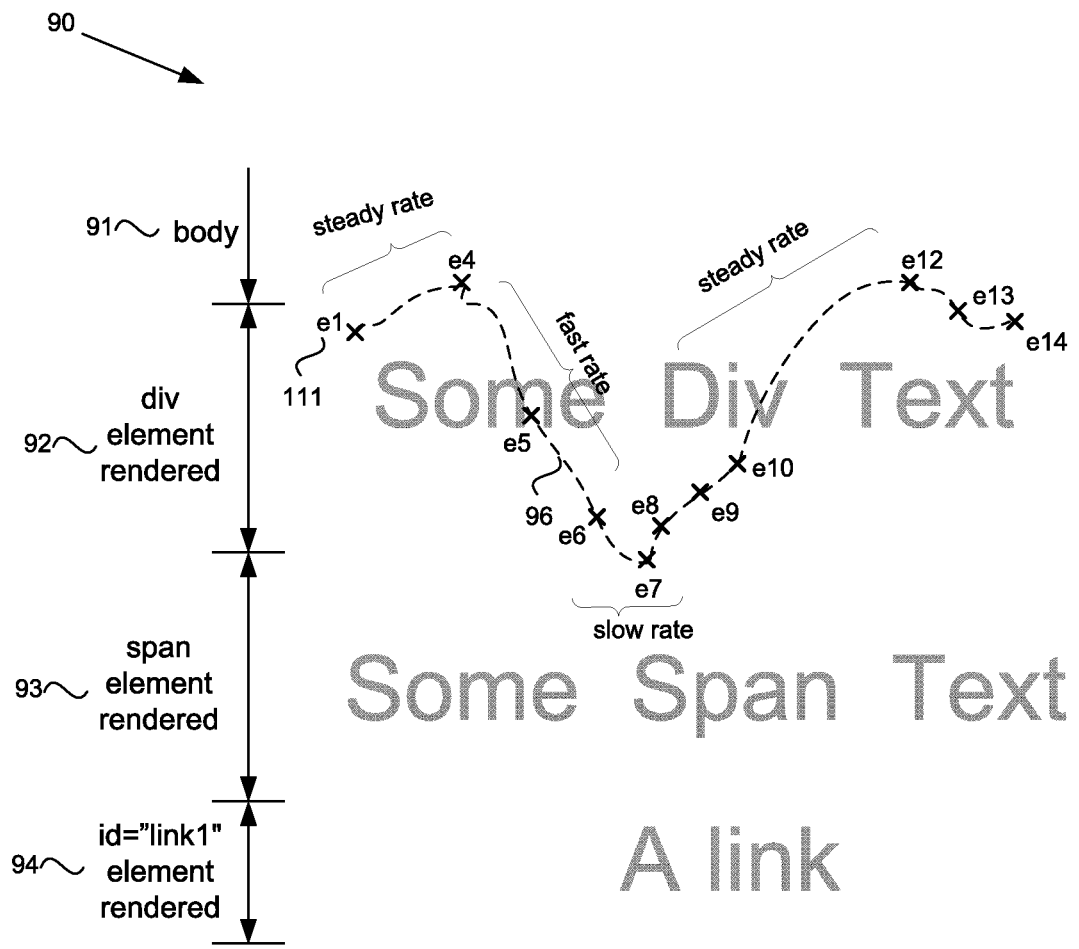
FIG. 9 illustrates a web page portion with mouse move events.

A magnified sample of an illustrative web page 90 is shown in FIG. 9. In the example, the web page 90 includes a body 91, a div element 92 with "Some Div Text" as its content, a span element 93 with "Some Span Text" as its content and a link element 94 featuring a link as its content. In various embodiments, the link element 94 may be an ad link selected and placed in a manner according to the present disclosure. The representative text is shown in a ghosted font to indicate that the actual content of the web page is relatively unimportant. The important aspects of the page are the page structure, the DOM elements and where the events occur with respect to the DOM elements.

In the example, a mouse path 96 registers mouse move events e1 . . . e14. In the events shown, the mouse tracked steadily across the top of the "So" in the rendered<div> text "Some Div Text" (e1-e4) and then tracked swiftly down through the word "Some". The mouse then moved slowly (e6-e9) and then tracked upwards to resume a steady pace along the top of the rendered<div> element (e9-14).

A table representing the mouse move events is shown in FIG. 10. For example, the table 110 of FIG. 10 shows that event e1 occurred at time=0 and at location x=100, y=100 which, as indicated in the table 110, occurs in the <div> element 92. The event type was recorded as a mouse move event. For the path 96 of FIG. 9, table 110 of FIG. 10 indicates that the events e4, e12 were received first in the event bubbling phase by the <body> element event handlers and e7 was received by the <span> event handlers. That is, in this mouse path 96, the mouse moved off of the <div> element three times, twice above the rendered<div> text and onto the <body> element (e4, e12) and once below the <div> element onto the <span> element (e7).

FIG. 11 shows corresponding attention analysis data 120 for the tabulated event 110 data of FIG. 10. The attention analysis concludes that events e1-e14 corresponding to time=0 to time=70 constitute a "linger" attention event "a1" and that the attention was focused 100% on the <div> element of the DOM. Also, the downward gesture corresponding to events e4-e10 may be analyzed as a "hint" which has a probabilistic assessment of being a hint of the attention shifting to the <span> element, with a 20% probability, and a hint to the <a id="link1"> element 94 with a probability of 80%. This example thus shows that a single stream of user events may be analyzed to contain multiple attention events. The attention analysis data 120 may be stored in the data store with the associated event stream provided by table 110. This example serves to illustrate two additional points. Events may not indicate attention on or for the DOM element on which the events are received e.g. the e4, e7, and e12 events are analyzed to indicate the <div> is receiving 100% of the "linger" attention event. Attention may be analyzed to be more relevant to DOM elements that are farther away from the DOM element(s) receiving the events e.g. attention event a2 receives (derives from) events that arrived on the <div> element but the "hint" was analyzed as being 80% likely relevant to the <a id="link1"> element which is further away than the <span> element which received only a 20% likelihood of being the target of this "hint" attention event. "Farther away" here means primarily the measure of the DOM elements as rendered in the viewport (viewport rendering location) but could also be approximated using the distance measure of the DOM elements within the structure of the DOM itself (DOM structure location). For the analysis to choose a "farther away" DOM element as the attention event target over a closer DOM element several factors may be considered. The rate of the underlying mouse movement during the events e4-e10 may contribute as may other factors such as the type of a possible target DOM element, if the DOM element is changing (scrolling, animated, video), is the style/color/font different from the source or intervening DOM elements, etc.

The attention analysis demonstrated in FIGS. 9 to 11 describes the analysis performed in respect of a single interaction. By repeating the process across many interactions from many clients for a single URL, aggregate data describing average areas of attention may be statistically determined.

The above described embodiments demonstrate a content interest analysis being performed in a distinct event server 12. In an alternative embodiment, any of the event module 25, attention analysis module 39 and content interest analysis module 38 may be provided as components of the web server 14, such that all processing of the event streams, including determining the aggregated areas of interest may be performed within the web server 14.

The event data provides fine grained attention tracking which is hard to falsify by automated means. By performing a statistical analysis of the event data across multiple interactions the most popular areas of a web page that attract the attention may be determined. Such information may be used in many content placement applications.

Figure 12:
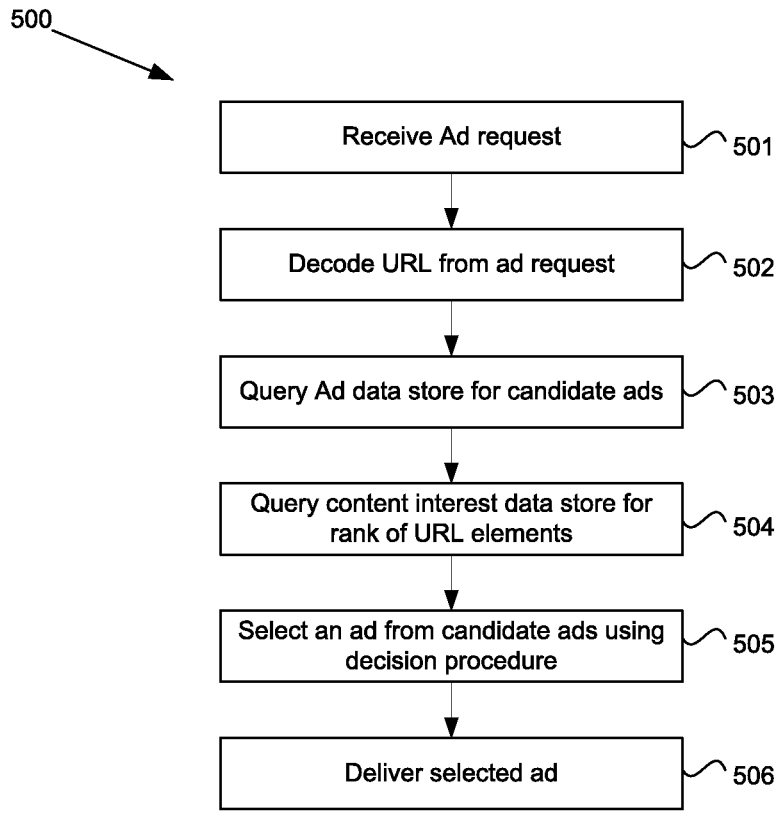
FIG. 12 illustrates a process for selecting an ad using attention data.

The ad server system 110 of FIG. 1 may use the attention analysis data to select an ad for placement into a web page. A process for placing an ad is depicted in the flowchart 500 of FIG. 12. At step 501, the ad server processing module 117 of the ad server 112 receives an ad request 115 from which the URL is decoded 502. At step 503, the ad data store 128 is queried for candidate ads. Ad candidates may be excluded from selection for a variety of reasons including that the advertiser's account balance is low, the size of the ad does not fit within the target element, etc. At step 504, the content interest data store 138 is queried for the attention analysis data in respect of the URL including a ranking of the elements of the page content corresponding to the URL. At step 505, a decision procedure is used to select an ad from the candidate ads and the ad 116 is provided to the web server 14 or client 15 at step 506. The decision procedure step 505 uses the attention analysis data to select the most relevant ad for placement into the web page loaded at the client. The relevance of an ad is determined with respect to the content of the more highly ranked elements of the web page.

The decision procedure may select an ad by assigning each candidate advertisement with a relevance score. In one embodiment, the relevance score may be calculated by matching the content of the advertisement to the content of the ranked web page elements. The decision procedure may match ads to the most highly ranked element only. For example, a relevance score may be determined for each candidate ad with the relevance score depending only on the content of the ad with respect to the content of the highest ranked element. This embodiment may be considered to have a binary weighting, in which the highest ranked element has a weighting value of 1, and all other elements have a weighting value of zero.

In an alternative embodiment, a relevance score may be determined for each candidate ad with the relevance score including a weighting for the degree to which the ad matches the content of the different web page elements. In this embodiment, ads that have low relevance to the top ranked element but high relevance to the page content corresponding to the URL as a whole may still be selected in preference to an ad which has relevance to only the top ranked element of the page content corresponding to the URL.

The decision procedure may make use of ad statistics including the performance of an ad. In prior art applications, performance is typically measured by click data. However, using the attention analysis methods described above, ad performance data can be measured even when an ad is not selected by a user. Ad statistics can be updated whenever an attention event indicates an attention shift to an ad element.

For the example shown in FIGS. 9 to 11, the link 94 may be an ad link and the attention event a2 is analyzed as an attention hint with the ad link being the destination of the user's attention shift. Thus, the attention analysis data indicates that the link has been successful in attracting the user's attention, even though the link was not actually selected. The ad statistics may be updated to record the attention event "a2" shown in FIG. 11. When updating the ad statistics for the ad link 94, the source element is also identified. The source element is the element from which the user attention shifted toward the ad. In the example of FIGS. 9 to 11, the source element is the <div> element 92. The most successful placed ads will be the ads that are relevant to the content chunks that most interest users. The most preferred pattern of behavior is an attention shift from a content chunk of high user interest as the source with the ad as the destination, even if the ad is not always selected. Thus, if an ad repeatedly delivered in a page gets attention but the source element is not within the top ranked content, then the ad may receive a low relevance score.

Figure 13:
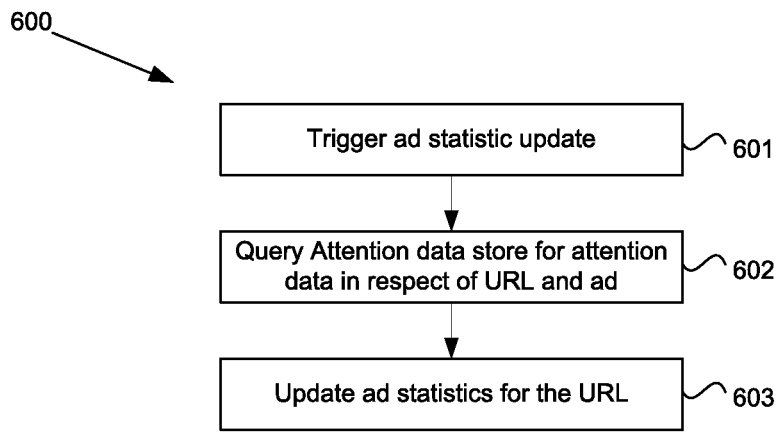
FIG. 13 illustrates a process for updating ad performance statistics.

A process for collating ad statistics is illustrated in the flowchart 600 of FIG. 13. At step 601, an ad statistic update is triggered, for example by a timeout, receipt of event stream data to the event server 12, an ad server request, a user activated trigger, etc. At step 602, the attention data store 28 is queried for event stream data and attention analysis data in respect of a particular URL and a particular ad. For example, the attention data may indicate time of the ad element in the viewport, a hint, linger, hover, read-over, partial click or select (i.e. click out) in respect of the ad element. If attention data is available for the ad in the URL, then ad statistics may be recorded or updated 603. In particular, ad statistics may include the source element and the relevance of the ad to the content of the source element.

The ad statistics can be used by the decision procedure (step 505, FIG. 12) when selecting an ad from the candidate ads. For example, an ad that has a history of attracting user attention from the highest ranked elements of the page content corresponding to the URL may be selected in preference to other candidate ads which may rate more highly on other factors, such as keyword relevance to the page content corresponding to the URL as a whole.

In one embodiment, the decision procedure may rely solely on the ad statistics without making use of any content matching. In an alternative embodiment, the decision procedure may combine multiple factors to produce a single relevance score for each candidate advertisement. For example, content matching of the ad to the highest ranked elements may be combined with ad performance statistics for that ad and that web page. Each of these factors may be assigned a weighting when combined into a relevance score. That is, the weighting may favor ads that have historically produced attention events when placed within the particular web page so that these ads will generate a higher relevance score during the decision procedure.

Once the relevance scores have been determined for the candidate ads, the most relevant ad may be selected and placed within the web page.

While the above described embodiments make specific reference to ranking the DOM elements of page content corresponding to a URL for their user content interest, the ranking may be performed in respect of other elements and divisions of a web page.

An advantage of the presently described embodiments for contextual placement of dynamic content includes that the contextual placement is determined not on the page content corresponding to the URL as a whole, but on those portions of the page content corresponding to the URL that are most popular. For example, a keyword may appear multiple times in a lowly ranked element of a document and would therefore be highly ranked for ad placements on prior art contextual placement arrangements. However, an ad that matches this keyword may be unlikely to be selected by the user because the user's attention is not directed to the lowly ranked elements in which the keyword appears. Keywords appearing fewer times in the whole page content corresponding to the URL but appearing in the more highly ranked elements are more likely to be selected and thus by placing ads dependent on the content interest areas of a web page, greater ad effectiveness can be achieved.

While the illustrated embodiments depict the ad server 112 and the event server 12 as separate entities, they may be incorporated into a single entity with the content interest data store 138 of the ad server 112 being incorporated within the data store 28 of the event server. In an alternative embodiment, the content interest data store 138 may be incorporated within the data store 28 of the event server 12 with the ad server processing module 117 accessing the data store 28 when attention data is required.

Figure 14:
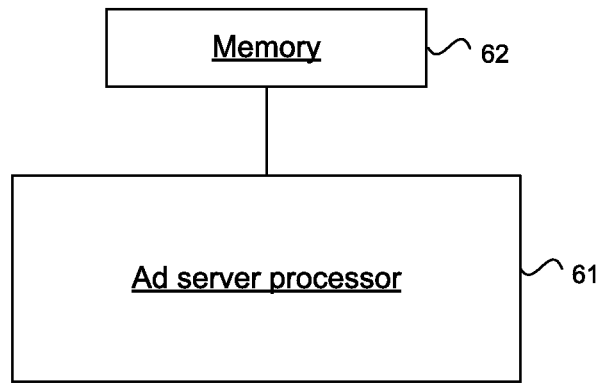
FIG. 14 illustrates a processor and memory of an ad server.
Figure 15:
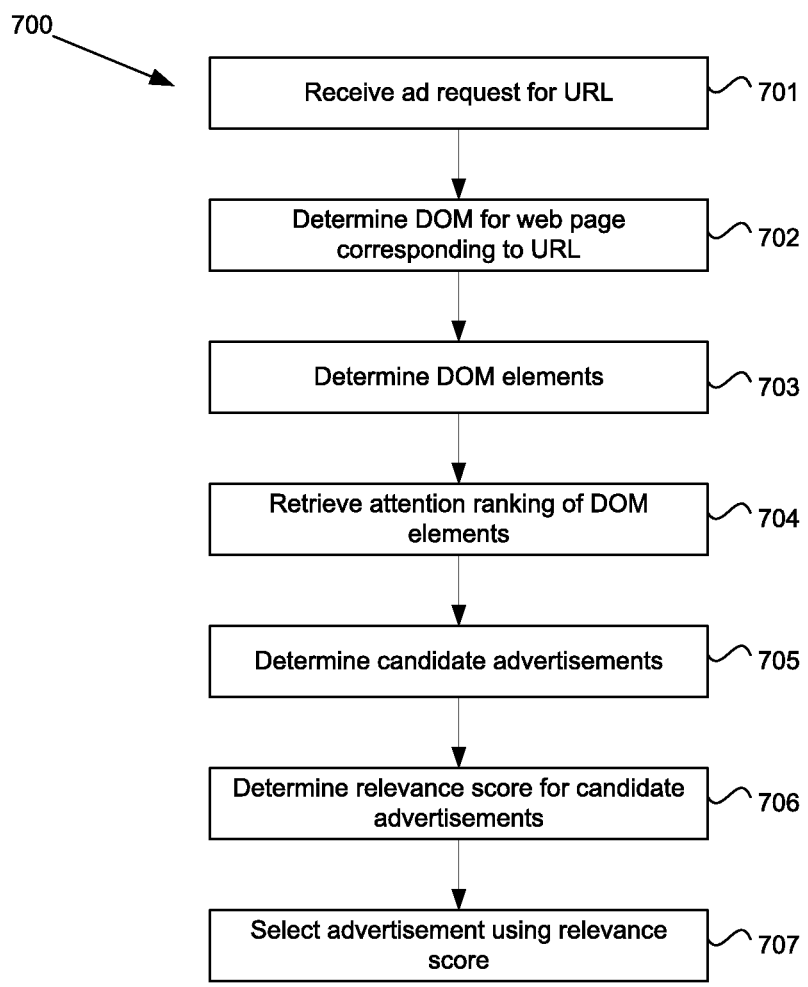
FIG. 15 illustrates an instruction set that may be executed on the processor and memory of FIG. 14.

The ad server 112 may be embodied in hardware, software, firmware or a combination of hardware, software and/or firmware. In a hardware embodiment, the ad server 112 may be provided in a device, such as server hardware, computer, etc including a processor 61 operatively associated with a memory 62 as shown in FIG. 14. The memory 62 may store instructions that are executable on the processor 61. In addition, the memory 62 may provide elements of the ad data store 128 and/or attention data store 138. An instruction set 700 that may be executed on the event server processor 61 is depicted in the flowchart of FIG. 15. Specifically, when executed, the instruction set 700 allows the processor to receive an advertisement placement request in respect of a URL at step 701. At step 702, a document object model of a web page corresponding to the URL is determined and a plurality of document object model elements of the URL are determined at step 703. At step 704, the processor retrieves an attention ranking of the document object model elements. The processor determines candidate advertisements at step 705 and determines a relevance score for each candidate advertisement 706 before selecting an advertisement from the plurality of candidate advertisements dependent on the relevance scores 707. The relevance score may be determined by calculating a content matching factor dependent on a match of the content of the advertisement to the content of a document object model element. The content matching factor may then be weighted based on the rank of the respective document object model element.

Figure 16:
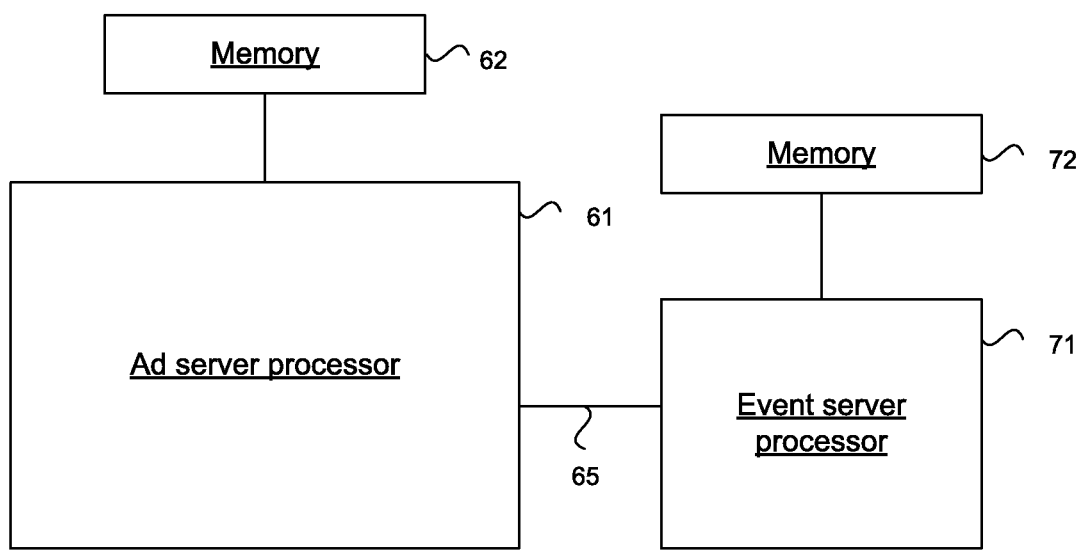
FIG. 16 illustrates the processor and memory of FIG. 14 in association with a processor and memory of an event server.

The document object model structure including the document object model elements may be retrieved by looking up information for the URL stored in memory 62 or by retrieving the information from associated or offsite resources such as the event server 12. The ad server processor 61 may communicate with a processor 71 of the event server, as shown in FIG. 16, through a suitable communications link 65. The DOM structure and content interest data including the ranked DOM element list may be stored in the memory 72 of the event server and communicated to the ad server processor 61 through the link 65.

The person skilled in the art will readily understand that the sequence of steps shown in the Figures and is provided for illustrative purposes only and that the order of steps is not essential. Furthermore, the person skilled in the art will recognize that a greater or lesser number of steps may be performed without departing from the scope of the disclosure.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A computer-implemented method for dynamically placing content into web pages, the method comprising:

accessing web page data corresponding to a web page, the web page corresponding to a plurality of versions including at least a first version and a second version, the first version including a first set of document object model (DOM) elements and the second version including a second set of DOM elements, the first set of DOM elements being at least partially different from the second set of DOM elements, each DOM element of the first and second set of DOM elements being associated with a screen area on the web page and an event handler that detects cursor movements within the screen area of the DOM element;

continuously receiving, at an event server, an event data stream representing a plurality of cursor movements occurring along a path of a cursor over the web page;

detecting a plurality of events within the event data stream, each event of the plurality of events being detected using the event handler corresponding to a DOM element of the screen area in which the event occurred, and the event handler detecting an event of the plurality of events in response to at least one cursor movement occurring along the path of the cursor within the corresponding DOM element;

grouping one or more events of the plurality of detected events to form a sequence of detected events within the group, the grouping of the one or more events being based on at least one cursor movement pattern that indicates a probabilistic locus of a user's attention;

determining at least one attention event as a result of forming the sequence of detected events, the detection of the at least one attention event indicating a probability that a DOM element is associated with a user's attention, the probability being based at least in part on a movement characteristic of the at least one attention event, and the DOM element associated with the user's attention being the DOM element within which the event occurred or another DOM element adjacent to the DOM element in which the event occurred;

determining a ranking for each DOM element included in each of the first set and second set of DOM elements associated with the plurality of versions of the web page, the ranking representing a popularity of the DOM element within the version of the web page, and the ranking being based on a ratio between a number of attention events associated with the DOM element and a total number of attention events associated with the DOM elements included in the first set and second set of DOM elements;

selecting a DOM element from amongst the DOM elements included in the first set and second set of DOM elements, the selection being based on the ranking associated with the DOM element;

identifying a plurality of candidate content elements for placing into the web page;

comparing content data of each candidate content element of the plurality of candidate content elements to content data of the selected DOM element;

based at least in part on the comparison, determining a relevance score for each of the plurality of candidate content elements selecting, based at least in part on the relevance score, a candidate content element from the plurality of candidate content elements; and placing the selected candidate content element into the web page.

2. The computer-implemented method according to claim 1, further comprising deriving attention data, wherein deriving the attention data comprises:

recording event data for a plurality of user interactions with the web page;

processing the event data for at least one interaction to create an attention data set for that interaction; and processing a plurality of the attention data sets to determine the attention data for the web page.

3. The computer-implemented method according to claim 2 wherein processing a plurality of the attention data sets comprises:

selecting a content element;

selecting an attention data set; and determining a ratio of interaction time attributable to the selected content element relative to a total interaction time of the selected attention data set, wherein the attention data comprises a list of content elements for the web page ranked at least partially dependent on said ratio.

4. The computer-implemented method according to claim 2 wherein processing the event data comprises determining at least one attention event in respect of at least one content element, and wherein processing a plurality of the attention data sets comprises:

selecting a content element; selecting an attention data set; and determining a ratio of attention events attributable to the selected content element relative to a total interaction time of the selected attention data set, wherein the attention data comprises a list of content elements for the web page ranked at least partially dependent on said ratio.

5. The computer-implemented method according to claim 2 wherein the content elements comprise DOM elements of a document object model of the web page.

6. The computer-implemented method according to claim 2 wherein the event data comprises a plurality of mouse move events.

7. The computer-implemented method according to claim 1, wherein attention data comprises a plurality of recorded attention events, wherein at least one attention event is derived from an interaction between a user and the web page comprising an embedded candidate advertisement within the web page, and wherein the at least one attention event indicates a shift in user attention from a source element of the web page to the embedded candidate advertisement.

8. The computer-implemented method according to claim 7 comprising determining a relevance score for at least one candidate content element dependent on the attention events for the respective candidate content element.

9. The computer-implemented method according to claim 8 wherein determining a relevance score for a candidate content element comprises:

determining a set of attention events for the web page, the set of attention events comprising the candidate content element as a destination element; for each attention event of the set, determining the web page source element of the attention event; and determining the relevance score dependent on the source elements of the attention events.

10. The computer-implemented method according claim 9 wherein the attention data comprises an attention rank of the source elements and wherein the relevance score is dependent on the attention rank.

11. The computer-implemented method according to claim 10, wherein selecting content element comprises selecting an advertisement for which the attention data comprises at least one attention event comprising a highest ranked element as the source element and the selected candidate content element as the destination element.

12. The computer-implemented method according to claim 7 comprising:

recording event stream data from the interaction; and processing the event stream data to derive one or more of the attention events; wherein the event stream data comprises a plurality of mouse move events.

13. A server for placing content elements into a web page, the server comprising:

a data store that stores a plurality of content elements;

a content interest data store that stores a list of document object (DOM) elements of the web page, the web page corresponding to a plurality of versions including a first version and a second version, the first version including a first set of DOM elements and the second version including a second set of DOM elements, the first set of DOM elements being at least partially different from the second set of DOM elements, each DOM element of the first and second set of DOM elements being associated with a screen area on the web page and an event handler that detects cursor movements and interactions within the screen area of the DOM element; and a processing module configured to:

receive a request corresponding to a Uniform Resource Locator (URL);

continuously receive an event data stream representing a plurality of cursor movements occurring along a path of a cursor over the web page;

detect a plurality of events within the event data stream, each event of the plurality of events being detected using the event handler corresponding to a DOM element of the screen area in which the event occurred, and the event handler detecting an event of the plurality of events in response to at least one cursor movement occurring along the path of the cursor within the corresponding DOM element;

group one or more events of the plurality of detected events to form a sequence of detected events within the group, the grouping of the one or more events being based on at least one cursor movement pattern that indicates a probabilistic locus of a user's attention;

determining at least one attention event as a result of forming the sequence of detected events, the detection of the at least one attention event indicating a probability that a DOM element is associated with a user's attention, the probability being based at least in part on a movement characteristic of the at least one attention event, and the DOM element associated with the user's attention being the DOM element within which the event occurred or another DOM element adjacent to the DOM element in which the event occurred;

determine a ranking for each DOM element included in each of the first set and second set of DOM elements associated with the plurality of versions of the web page, the ranking representing a popularity of the DOM element within the version of the web page, and the ranking being based on a ratio between a number of attention events associated with the DOM element and a total number of attention events associated with the DOM elements included in the first set and second set of DOM elements select a DOM element from amongst the DOM elements included in the first set and second set of DOM elements, the selection being based on the ranking associated with the DOM element;

identify a plurality of candidate content elements for placing into the web page;

compare content data of each candidate content element of the plurality of candidate content elements to content data of the selected DOM element;

based at least in part on the comparison, determine a relevance score for each of the plurality of candidate content elements select, based at least in part on the relevance score, a candidate content element place the selected candidate content element into the web page; and placing the selected candidate content element into the web page.

14. The server according to claim 13, wherein the processing module is configured to select an ad for which ad performance statistics comprise at least one attention event comprising a highest ranked document object model as a source element and the selected ad as a destination element.

15. A non-transitory computer-readable medium comprising computer executable instructions for execution by a processor, that, when executed, cause the processor to:

access web page data corresponding to a web page, the web page corresponding to a plurality of versions including a first version and a second version, the first version including a first set of document object model (DOM) elements and the second version including a second set of DOM elements, the first set of Dom elements being at least partially different from the second set of DOM elements, each DOM element of the first set and second set of DOM elements being associated with a screen area on the web page and an event handler that detects cursor movements or interactions within the screen area of the DOM element;

continuously receive, at an event server, an event data stream representing a plurality of cursor movements occurring along a path of a cursor over the web page;

detect a plurality of events within the event data stream, each event of the plurality of events being detected using the event handler corresponding to a DOM element of the screen area in which the event occurred, and the event handler detecting an event of the plurality of events in response to at least one cursor movement occurring along the path of the cursor within the corresponding DOM element;

group one or more events of the plurality of detected events to form a sequence of detected events within the group, the grouping of the one or more events being based on at least one cursor movement pattern that indicates a probabilistic locus of a user's attention;

determine at least one attention event as a result of forming the sequence of detected events, the detection of the at least one attention event indicating a probability that a DOM element is associated with a user's attention, the probability being based at least in part on a movement characteristic of the at least one attention event, and the DOM element associated with the user's attention being the DOM element within which the event occurred or another DOM element adjacent to the DOM element in which the event occurred;

determine a ranking for each DOM element included in each of the first set and second set of DOM elements associated with the plurality of versions of the web page, the ranking representing a popularity of the DOM element within the version of the web page, and the ranking being based on a ratio between a number of attention events associated with the DOM element and a total number of attention events associated with the DOM elements included in the first set and second set of DOM elements;

select a DOM element from amongst the DOM elements included in the first set and second set of DOM elements, the selection being based on the ranking associated with the DOM element;

identify a plurality of candidate content elements for placing into the web page;

compare content data of each candidate content element of the plurality of candidate content elements to content data of the selected DOM element;

based at least in part on the comparison, determine a relevance score for each of the plurality of candidate content elements select, based at least in part on the relevance score, a candidate content element from the plurality of candidate content elements; and place the selected candidate content element into the web page.

16. The non-transitory computer-readable medium according to claim 15 wherein determining the relevance score comprises:

determining a set of attention events for the web page that comprise the respective candidate content element as a destination element;

for each attention event of the set, determining the DOM element that is a source of the attention event; and weighting the relevance score dependent on the rank of the source element of the attention events.

* * * * *

UNITED STATES PATENT AND TRADEMARK OFFICE
CERTIFICATE OF CORRECTION

PATENT NO. : 10,699,235 B2  
APPLICATION NO. : 12/435770  
DATED : June 30, 2020  
INVENTOR(S) : Hauser Page 1 of 1

It is certified that error appears in the above-identified patent and that said Letters Patent is hereby corrected as shown below:

In the Specification

In Column 7, Line 38, delete "may by" and insert -- may be --, therefor.

In the Claims

In Column 14, Line 23, in Claim 10, after "according" insert -- to --.

In Column 15, Line 58, in Claim 15, delete "Dom" and insert -- DOM --, therefor.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*